US010782668B2

(12) United States Patent
Wang et al.

(10) Patent No.: US 10,782,668 B2
(45) Date of Patent: Sep. 22, 2020

(54) DEVELOPMENT OF CONTROL APPLICATIONS IN AUGMENTED REALITY ENVIRONMENT (71) Applicant: Siemens Aktiengesellschaft, Munich (DE)

(72) Inventors: Lingyun Wang, Princeton, NJ (US); Hasan Sinan Bank, Princeton, NJ (US); Mareike Kritzler, San Francisco, CA (US); Phani Ram Kumar Kuruganty, Robbinsville, NJ (US); Naveen Kumar Singa, Plainsboro, NJ (US); Ziyan Wu, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 11 days.

(21) Appl. No.: 15/918,081

(22) Filed: Mar. 12, 2018

(65) Prior Publication Data
US 2018/0267496 A1    Sep. 20, 2018

Related U.S. Application Data (60) Provisional application No. 62/472,222, filed on Mar. 16, 2017.

(51) Int. Cl.
*G05B 19/05*    (2006.01)
*G06F 3/0481*   (2013.01)
(Continued)

(52) U.S. Cl.
CPC ..... *G05B 19/056* (2013.01); *G05B 19/41885* (2013.01); *G06F 3/04815* (2013.01);
(Continued)

(58) Field of Classification Search
CPC .......... G05B 19/056; G05B 19/41885
(Continued)

(56) References Cited

U.S. PATENT DOCUMENTS 7,626,569 B2 * 12/2009 Lanier ............... G06F 1/1601
345/156
8,405,680 B1 * 3/2013 Cardoso Lopes ..... G06T 19/00
345/426
(Continued)

FOREIGN PATENT DOCUMENTS

WO    20150175739 A1    11/2015

OTHER PUBLICATIONS

Kiswanto, Gandjar, et al., "development of augmented reality (AR) for machining simulation of 3-axis CNC milling", 2013 International Conference on advanced computer science and information systems (ICACSIS), IEEE, Sep. 28, 2013, pp. 143-148, XP032578224, DOI: 10.1109/ICACSIS.2013.6761566 / Sep. 28, 2013.
(Continued)

*Primary Examiner* — Javid A Amini (57) ABSTRACT

A system and method is disclosed for development of a control application for a controller of an automation system. The controller receives sensor signals associated with perception of a first real component during an execution of the control application program. Activity of a virtual component, including interaction with the real first component, is simulated, the virtual component being a digital twin of a second real component designed for the work environment and absent in the work environment. Virtual data is produced in response to the simulated activity of the virtual component. A control application module determines parameters for development of the control application program using the sensor signals for the first real component and the virtual data. An AR display signal for the work environment is rendered and displayed based on a digital representation of the virtual data during an execution of the control application program.

16 Claims, 4 Drawing Sheets

(51) Int. Cl.
*G06T 19/00* (2011.01)
*G05B 19/418* (2006.01)

(52) U.S. Cl.
CPC .. *G06T 19/006* (2013.01); *G05B 2219/13004* (2013.01); *G05B 2219/32014* (2013.01); *G05B 2219/40131* (2013.01); *G06T 2200/24* (2013.01); *Y02P 90/26* (2015.11)

(58) Field of Classification Search
USPC ......................................................... 345/633
See application file for complete search history.

(56) References Cited

U.S. PATENT DOCUMENTS

| | | | |
|---|---|---|---|
| 9,529,424 | B2 | 12/2016 | Hilliges et al. |
| 9,578,076 | B2 | 2/2017 | Olivier et al. |
| 9,836,117 | B2 | 12/2017 | Shapira |
| 2005/0245302 | A1* | 11/2005 | Bathiche ................ A63F 13/00 463/1 |
| 2007/0088526 | A1 | 4/2007 | Friedrich et al. |
| 2008/0310707 | A1 | 12/2008 | Kansai et al. |
| 2009/0088884 | A1 | 4/2009 | Yuan et al. |
| 2012/0113223 | A1 | 5/2012 | Hilliges et al. |
| 2015/0331415 | A1 | 11/2015 | Feniello et al. |
| 2017/0302903 | A1* | 10/2017 | Ng ........................ G06T 15/205 |
| 2018/0257773 | A1* | 9/2018 | Wypyszynski ....... B64C 31/028 |
| 2018/0308377 | A1* | 10/2018 | Pena-Rios ............... G06F 3/011 |

OTHER PUBLICATIONS

Honig, Wolfgang, et al., "mixed reality for robotics", 2015 IEEE/RSJ International conference on intelligent robots and systems (IROS), Sep. 28, 2015, pp. 5382-5387, XP032832406, DOI: 10.1109/IROS.2015.7354138 / Sep. 28, 2015.

Head-mounted display als facharbeiterorientierte Unterstützungskomponente an CNC-Werkzeugmaschinen; R.Daude, C.Schlick, H.Luczak, M.Weck "Head-mounted display als facharbeiterorientierte Unterstützungskomponente an CNC-Werkzeugmaschinen", Werkstatttechnik, Springer-Verlag, Berlin, Bd.86, Nr.5, 1.Mai 1996, S.248-252 / May 1, 1996.

European Search Report; 11 pages; Application No: 18161803.4-1205.

Werner, Stephan, et al., "Software-in-the-Loop Simulation of Embedded Control Applications based on Virtual Platforms"; Stephan al.; 2015 25th International Conference on Field Programmable Logic and Application (FPL); IEEE, 2015.

Weeks, Robert W., et al., "Automotive Engine Modeling for Real-Time Control Using MATLAB/SIMULINK"; SAE Technical Papers Series; 1995.

De Cuyper et al., "Vehicle Dynamics with LMS Virtual.Lab Motion" Vehicle System Dynamics: International Journal of Vehicle Mechanics and Mobility; Mar. 11, 2008.

* cited by examiner

DEVELOPMENT OF CONTROL APPLICATIONS IN AUGMENTED REALITY ENVIRONMENT

TECHNICAL FIELD

This application relates to automation and control. More particularly, this application relates to Augmented Reality assisted development of control application programs.

BACKGROUND

Automation systems can be applied to production processes having a multitude of devices requiring automated control, such as robots, conveyors, gantries, grippers, and the like. Controllers (e.g., a programmable logic controller (PLC)) of such devices can be programmed during an engineering phase with the assistance of graphical computer-based tools. In current manufacturing practices, control application development may occur during different phases of engineering and design of a new installation. For example, during setup and integration of multiple machines, a system integrator may develop part of the control application for a particular task of a machine. Further development of the control application may occur during the commissioning of each machine. In general, setup and commissioning of a manufacturing automation system involve, but are not limited to, the order and delivery of hardware (e.g., sensors, controllers, drives, and actuators), assembly of components based on design, and configuration, commission and testing of hardware such as controllers and drives. During the development of a control application, any hardware defect causes a hiatus while awaiting replacement or repair of the hardware component. Such delays negatively affect manufacturing throughput and rate of profit for a factory. In addition, locating the origin of a defect or error in large factories during setup and commissioning, where one out of hundreds of sensors could be the reason for an error, is quite challenging.

Current solutions to the aforementioned problems include a hardware-in-the-loop or software-in-the-loop simulation environment, (e.g., Matlab/Simulink, Siemens LMS Virtual Lab). Simulation prior to setup, in theory, enables the control engineer to work out the majority of glitches before setup of the system function and control hardware. However, using these simulation tools requires extensive expert knowledge including intensive mathematical modeling of dynamic systems, vibration, vehicle dynamics, and control theory, to name a few. Such simulation tools are thus expensive regarding time to simulate, required knowledge, and hardware/software costs. Moreover, current packaged simulation tools lack intuitive user interfaces when merging real and virtual components. Mathematical models require formulations to tune control coefficients based on system requirements. For example, various sensor models may be utilized to develop a controller. After an initial tuning, the control application code may be uploaded to the controller, such as a Programmable Logic Controller (PLC), and testing for commissioning of the hardware control operations can commence. The control engineer may likely require several retunings of the control application due to mismatches between the mathematical models and the actual system hardware.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Hereafter, the term "Augmented Reality" (AR) is used to describe a combined environment of real objects and virtual objects. Virtual objects may be simulated using AR, Mixed Reality (MR), or Virtual Reality (VR) techniques. For simplicity, the term AR is used in this disclosure.

A method and system is disclosed in which an AR application enables the improvement of an automation of tasks related to development and testing of a control application program of a system controller. During engineering mode of an automation control system, a specialized computer sets control parameters while building the code for the control application program. The disclosed method and system presents an improvement to the functionality of the computer used to perform such a computer based task. While currently available tools simulate the controller to develop the operating and control parameters, the embodiments of the present disclosure enable the controller to be installed and connected to an augmented reality (AR) environment, which has several advantages, including development and testing the control applications in incremental stages of plant installation, allowing unavailable elements of the physical plant installation to be simulated. The control application program development can progress before the plant installation is fully commissioned. Another advantage is to have the actual controller executing the control applications during the development of the control applications. AR simulation of digital twins may generate virtual data to mimic real sensor inputs to the controller during execution of the control applications. The AR simulation also allows control application development to proceed in the event of missing components, such as a defective machine removed for repair or replacement in the setup phase of the installation, or while awaiting first shipment of the machine.

Figure 1:
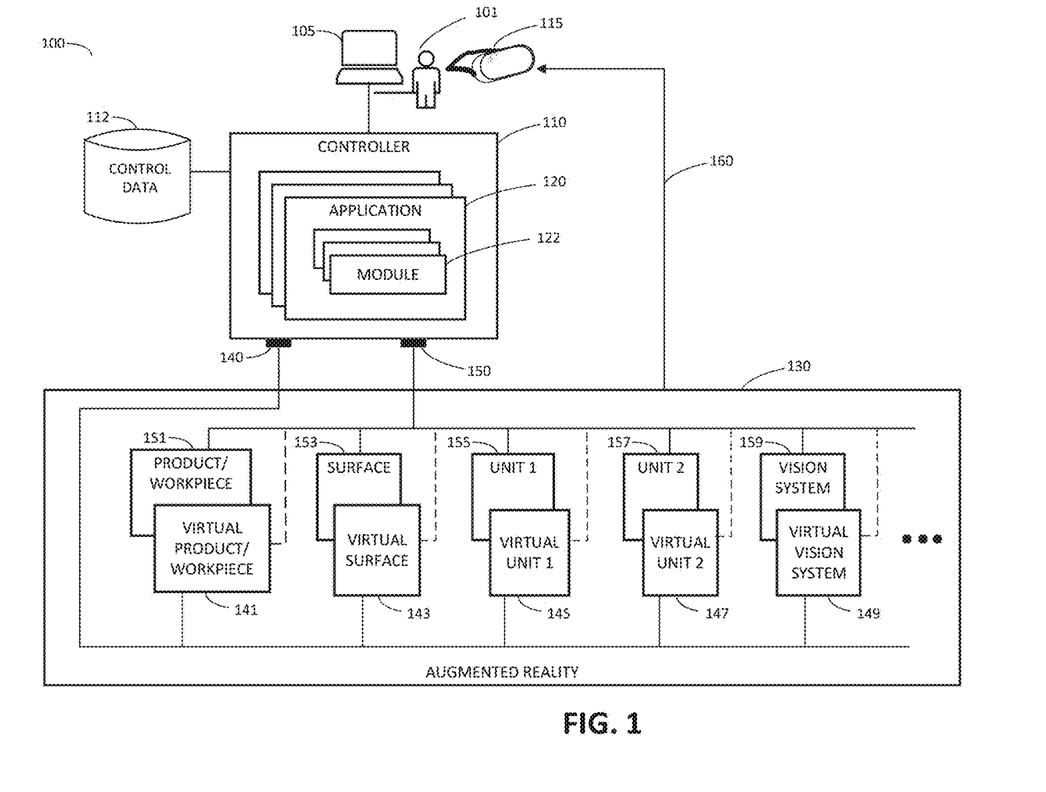
FIG. 1 shows an example of a system of computer based tools according to embodiments of this disclosure.

FIG. 1 shows an example of a system of computer based tools according to embodiments of this disclosure. In an embodiment, a user 101 may wear an Augmented Reality (AR) device 115, such as Microsoft HoloLens, while operating a graphical user interface (GUI) device 105 to develop a control application program 120 for a controller 110. The controller 110, such as a PLC, may have multiple application programs 120 stored in a memory, each program for performing a particular control task in an automation arrangement. For each control application 120, one or more modules 122 may be developed to process inputs and/or outputs of a particular control component including, but not limited to various sensors, such as motion, vibration, temperature, pressure, optic, and audio. The AR device 115 may be configured to accept hand gesture inputs from user 101 for editing, tuning, updating, or interrupting the control applications 120. The AR device 115 may be a wearable viewing device that can display a digital representation of a simulated object on a display screen superimposed and aligned with real objects in a work environment. The AR device 115 may be configured to display the AR work environment as the user 101 monitors execution of the control application programs 120. The GUI device 105 may be implemented as a computer device such as a tablet, keypad, or touchscreen to enable editing, tuning or updating of the control applications 120 based on user 101 inputs.

AR system data 130 may include various digital and analog signals and quadrature pulses received from various sensors, switches, high speed counters, or a combination thereof. Examples of sensor types may include one or more of motion, vibration, temperature, rotary speed, pressure, optic, and audio. Such data from actual sensors is referred as "real data" hereafter to distinguish from virtual data obtained from simulated entities or digital twins of the physical components. As shown in FIG. 1, real product/workpiece data 151 may include signals related to any sensing, switching or counting devices used for tracking and monitoring a product or workpiece in the work environment. For example, perception sensors may be installed in a work area for monitoring and tracking of the product/workpiece. Other examples of real data include real surface data 153 related to a work surface for the workpiece, real unit 1 data and real unit 2 data related to robotic or gantry devices, and real vision system data 159 related to visual sensing devices. Real data is received by the controller 110 at input module 150, which may be configured as separate modules for each respective input signal, and may convert the signals to input information useable by the control application.

The AR system data 130 may include virtual data related to characteristics of simulated components of the AR environment. The virtual data may be in the format of simulated signals such as the analog, digital or pulse signals as described for the real data. The virtual data may also be provided to the controller 110 in a format already converted to information useable by the control application 120. The input module 140 may be configured to receive the virtual data in either format. In one embodiment, the virtual data may be sent to the controller 110 via input module 150, or divided and sent via both input modules 140 and 150. As shown in FIG. 1, virtual product/workpiece data 141 may include any signals or information related to a simulation of the product or workpiece as produced by the AR device 115 or a separate AR simulator (not shown). For example, virtual product/workpiece data 141 may include reactive motion responsive to the simulated environment, which may be translated into a visual representation 160 of the virtual product/workpiece for presentation in AR device 115. Other virtual data may include virtual surface data 143 related to a simulation of the surface for a workpiece, and virtual unit 1 data 145 and virtual unit 2 data 147 related to activity of digital twins of real unit 1 and real unit 2. Virtual vision system data 149 may be based on simulated perceptions of a digital twin.

Having real data/virtual data combinations in the AR system 130 allows for various simulations of an AR environment. For example, in a real-virtual mode, the AR system 130 allows the controller to process data for one or more real control components simultaneously with data for one or more virtual control components when developing and training the control application modules 122. For example, a real product may be present in the AR environment and virtual workpiece may be simulated to coexist with the real product during a simulation of interaction between the product and the workpiece. In this case, real product data 151 includes sensor signals received from sensors reactive to activity of the real product, and virtual workpiece data 141 includes signals and information produced in reaction to activity and behavior of the simulated workpiece. In an embodiment, control sensors associated with a robotic unit 1 may produce real unit 1 data 155. For example, motion sensors may provide signals to analyze maximum speed thresholds for robotic components. If robotic unit 2 is not yet installed, virtual unit 2 data 147 may be simulated for display on the AR device 115 and for interaction with the control application 120.

The AR system 130 may operate in a virtual-virtual mode in which one or more digital twins respond to a corresponding control application program module 122 and simulate activity or operations tracked by the AR device 115 or an AR simulator to produce corresponding virtual data inputs to the controller 110, and a visual simulation displayed on the AR device 115.

As another example, the AR system 130 may operate in a real-real mode, where only real components interface with actual sensors and with the corresponding control application modules 120. In such case, the AR device 115 may provide display of one or more simulated structures or objects within the work environment, such as products or workpieces or obstacles during testing and commissioning of the automation installation. The AR device 115 may also display a simulated path or movement of a real component as a visual prediction displayed to the user 101 prior to the actual path or movement. Such a prediction may be useful to make adjustments to the physical plant or to the control application prior to the actual operation on the real objects.

In an embodiment to design a control application program for implementation by a programmable logic controller (PLC), the knowledge about the control system manipulated during the design and engineering phase, and stored as control data 112, may include one or more of the following: connectivity between devices; sensors and actuators, inputs and outputs for devices and device connectivity; functions, function blocks, organization blocks, programs, processes, and logical relationships amongst them; control variable names and address assignment of variables to specific programs and processes on one side and devices on the other side; data types and variable types (e.g., global, direct, I/O, external, temporary, time etc.); and explanation and justification of control logic, control loops, control structure in the control program in form of comments and notes; and auxiliary code used for testing, observing, tracing, and debugging a by a portal such as GUI 105 in conjunction with interface to the AR device 115 in accordance with the embodiments of the disclosure.

While particular real-virtual combinations of data of AR system 130 have been shown and described, other embodiments may include various other kinds of data alternatively or additionally, depending on the number and type of control components to be simulated for development of the control application program.

Figure 2:
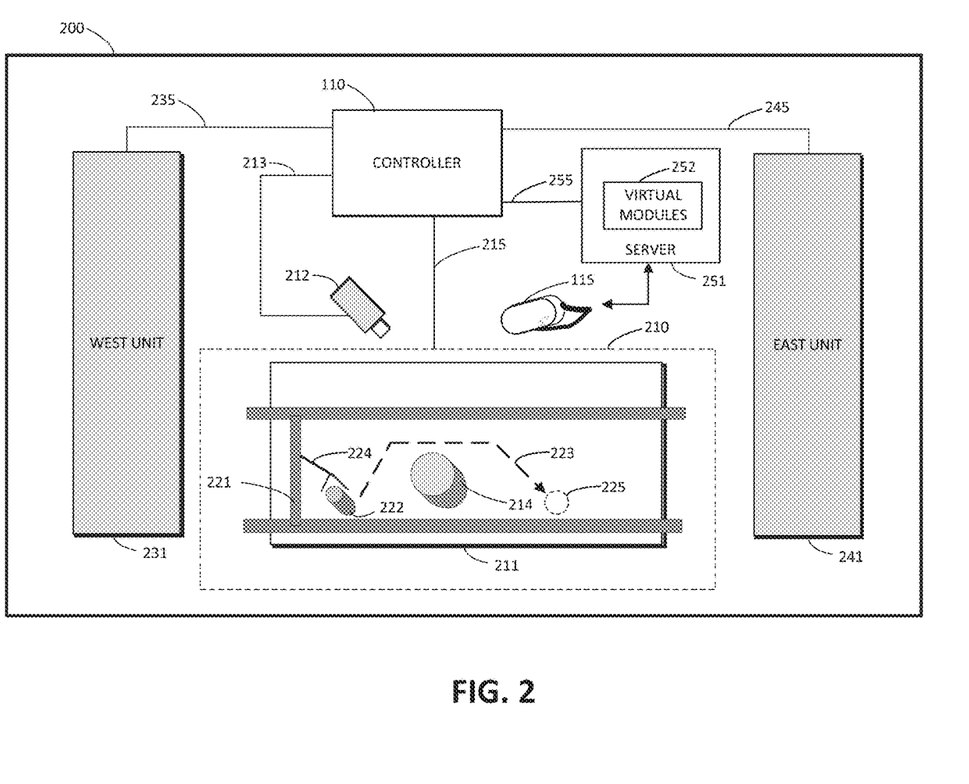
FIG. 2 shows an example configuration of an Augmented Reality environment according to embodiments of the disclosure.

FIG. 2 shows an example configuration of an AR environment according to embodiments of the disclosure. Shown as a plan view, manufacturing line 200 may include a west unit 231 and east unit 241 that each interface with section 210. Server 251 may include one or more processors to execute virtual modules 252 to generate digital twins for simulation of hardware counterparts in section 210. Virtual control data, such as sensor simulations, are fed to the controller 110 via data input 255. Visual sensor data from sensor 212 provides visual information related to activity in section 210. Other sensor signals and data from sensors installed in section 210 are fed to the controller 110 via input 215. In an embodiment, west unit 231 and east unit 241 may have hardware completely installed, which may have control programming already tested and commissioned, while section 210 is currently being modeled and displayed with the help of AR device 115 for development of its control application programming. West unit 231 and east unit 241 may include various hardware elements as part of an automation arrangement to be interfaced with section 210. For example, west unit 231 and east unit 241 may include one or more of a SCADA/HMI, a controller, material flow systems (e.g., input/output conveyors), gantry robot with grippers (e.g. a packaging system), jigs, tables for mounting equipment, and/or a vision system with cameras and other sensors (e.g., a photo eye) on a conveyor. Sensor data 235 from west unit 235 and sensor data 245 from east unit 241 Section 210 may be simulated and modeled in AR in preparation for a hardware installation to include any of the aforementioned hardware types. One advantage of such a mixed simulation is to allow the controller to process sensor data 235 and 245 related to control components for ready installations, such as west unit 231 and east unit 241, in conjunction with the AR data 215, 215 and 255 for section 210. This may provide a simulation more aligned to the eventual hardware installation (i.e., real-real environment) of section 210 with richer control data for the simulation. For example, there may be control parameters in section 210 that are dependent upon control parameters of west unit 231 and east unit 241, in which case having controller 110 process all control parameters at once with assistance of AR data 213, 215, 255 may enhance the development of the control application program for section 210 during the simulation. Simulation data provided by virtual modules 252 may be generated using tools such as Siemens LMS Virtual Lab, or the like.

In an embodiment, some or all of the hardware components for section 210 may have been designed by a design engineer, and at least one of the hardware components is absent for a reason such as awaiting delivery and setup for the installation. In an example as shown in FIG. 2, the automation process line 200 may relate to a packaging operation, where an algorithm for pick and place tasks may be developed for section 210 using a gantry and gripper for moving an object along a path on the line of an automation process. By way of example, the gantry and gripper equipment may have been designed and needs to be simulated in AR so that a control application can be developed in the absence of the actual gantry and gripper hardware components. A virtual gantry 221 and virtual gripper 224 is shown, representing the AR simulation that may be rendered and displayed on the AR device 115. The virtual gantry 221 and virtual gripper 224 may be simulated in virtual modules 252 to move a virtual workpiece 222 along a path 223 on a real table 211 for a collision avoidance application program. A visual sensor 212, such as a camera, may provide input to the controller 110 to provide an AR input that represents the optics for the real components, such as table 211 and a real object 214. The AR device 115 may be equipped with a camera that could also provide visual data of real objects. The visual data from visual sensor 212 may also be provided to the AR device 115 via a wired or wireless connection for an AR display of the simulated operation in section 210, which enables remote viewing of the simulated operation.

For the example simulation, the real object 214 may act as an obstacle for the virtual workpiece 222. For an initial training of the control application, the AR device 115 may be used to observe the path of the virtual workpiece as it travels along a designed path 223 to a target 225. The user 101 may initially setup the control application using initial parameters to allow training of the control application. For example, where maximum gantry speed is unknown, the initial speed parameters may be set low for subsequent upward adjustments until a threshold is met. Alternatively, the initial speed parameters may be set high for subsequent downward adjustments until a threshold is met. A control application module 122 may receive inputs from the sensors, compute motion of gantry 221 and/or gripper 224, monitor for obstacles based on additional sensor inputs, receive coordinates of obstacle object 214 from the vision system, and compute a new path for gantry 221 controller. Should the virtual workpiece fail to follow the path 223 around the obstacle object 214, the user may interrupt the simulation, such as by using a hand gesture with the AR device 115, then modify the control application using GUI 105 to make necessary adjustments. In addition, sensor inputs to the control system 100 may be received from west unit 231 and/or east unit 241 which may have to be coordinated with control operations at section 210. For example, conveyor speed may be sensed at west unit 231 for coordination with receiving workpiece 222. As such, controller 110 may determine necessary timing adjustments and conveyor speed adjustments accordingly, based on the mixed reality simulation of section 210.

The AR simulation may be rerun to test the adjusted control application, and with additional iterations as necessary, until operation of the simulated control component is successful. The above simulation provides an example of training the controller application modules to learn various possible paths for a robotic unit, such as a gantry and/or gripper, for which control instructions are to be executed for motion control in conjunction with feedback from various sensor inputs.

Figure 3:
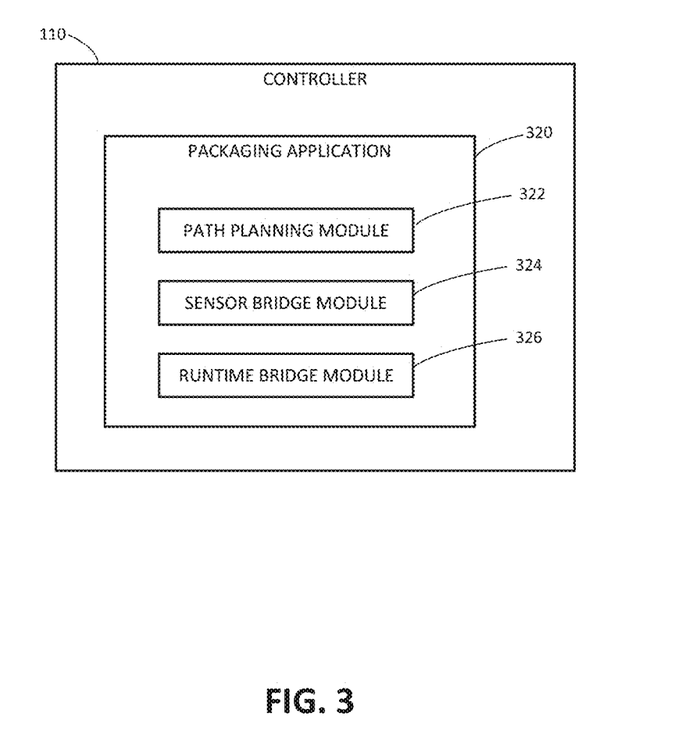
FIG. 3 shows a diagram of a control application architecture according to an embodiment of the disclosure.

FIG. 3 shows a diagram of a control application architecture according to an embodiment of the disclosure. In an embodiment, the controller 110 may include a packaging application program 320 for handling a particular set of control functions related to the control assembly shown in FIG. 2. For example, the control application program 320 may relate to controls for packaging components along the automation process line 200. The application program 120 may include one or more modules to process inputs and outputs of the control system components, such as a path planning module 322, a sensor bridge module 324, and a runtime bridge module 326. The path planning module 322 may include instructions and coding related to operating the gantry 221 and gripper 224 used to move a workpiece 222 along a path 223 within a workspace. During simulation of a virtual gantry 221 and gripper 224, the control application program may receive inputs related to coordinates of the simulated path. The sensor bridge module 324 may include coding and instructions related to processing outputs of sensors on the gantry bridge 221, such as positioning feedback signals from the sensors. The runtime bridge module 326 may include coding and instructions related to the runtime of a bridge component, such as tracking the runtime of the gripper 224 as it moves along each of the x-y-z axes. For example, the runtime along the x-axis may provide information to controller 110 for determining an instruction for where the gantry and gripper are currently located and to permit determination of a next instruction for the controller to move the gantry and gripper position.

In another embodiment, the AR device 115 of FIG. 1 may be configured to perform safety operations related to an automation process. For example, a virtual robotic unit may be displayed on the AR device 115 while performing various programmed movements, allowing the user to monitor for any potential hazards to a worker in the working environment, such as a possible collision between the worker and a workpiece or the robotic unit. If the simulated path of the robotic unit exposes the worker to a hazard, the control application may be modified by the user to alter the programmed path to avoid the potential harm.

Figure 4:
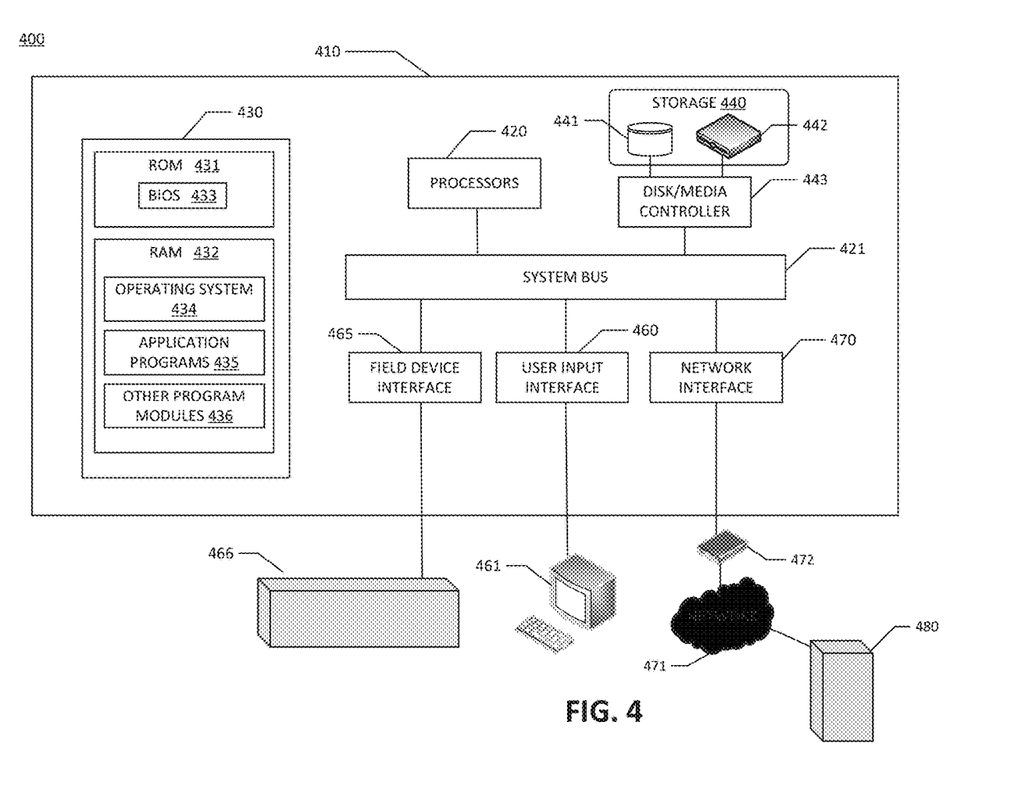
FIG. 4 illustrates an example of a computing environment within which embodiments of the disclosure may be implemented.

FIG. 4 illustrates an example of a computing environment within which embodiments of the present disclosure may be implemented. A computing environment 400 includes a computer system 410 that may include a communication mechanism such as a system bus 421 or other communication mechanism for communicating information within the computer system 410. The computer system 410 further includes one or more processors 420 coupled with the system bus 421 for processing the information.

The processors 420 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 420 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 421 may include at least one of a system bus, a memory bus, an address bus, or a message bus, and may permit exchange of information (e.g., data (including computer-executable code), signaling, etc.) between various components of the computer system 410. The system bus 421 may include, without limitation, a memory bus or a memory controller, a peripheral bus, an accelerated graphics port, and so forth. The system bus 421 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 410 may also include a system memory 430 coupled to the system bus 421 for storing information and instructions to be executed by processors 420. The system memory 430 may include computer readable storage media in the form of volatile and/or nonvolatile memory, such as read only memory (ROM) 431 and/or random access memory (RAM) 432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 may additionally include, for example, operating system 434, application programs 435, and other program modules 436. For example, the application programs 435 may include application programs 120 and application programs used to run on the AR device 115 as shown in FIG. 1 and described herein. Application programs 435 may also include a user portal for development of the control application program, allowing input parameters to be entered and modified as necessary.

The operating system 434 may be loaded into the memory 430 and may provide an interface between other application software executing on the computer system 410 and hardware resources of the computer system 410. More specifically, the operating system 434 may include a set of computer-executable instructions for managing hardware resources of the computer system 410 and for providing common services to other application programs (e.g., managing memory allocation among various application programs). In certain example embodiments, the operating system 434 may control execution of one or more of the program modules depicted as being stored in the data storage 440. The operating system 434 may include any operating system now known or which may be developed in the future including, but not limited to, any server operating system, any mainframe operating system, or any other proprietary or non-proprietary operating system.

The computer system 410 may also include a disk/media controller 443 coupled to the system bus 421 to control one or more storage devices for storing information and instructions, such as a magnetic hard disk 441 and/or a removable media drive 442 (e.g., floppy disk drive, compact disc drive, tape drive, flash drive, and/or solid state drive). Storage devices 440 may be added to the computer system 410 using an appropriate device interface (e.g., a small computer system interface (SCSI), integrated device electronics (IDE), Universal Serial Bus (USB), or FireWire). Storage devices 441, 442 may be external to the computer system 410.

The computer system 410 may also include a field device interface 465 coupled to the system bus 421 to control a field device 466, such as a device used in a production line. The computer system 410 may include a user input interface or GUI 461, which may comprise one or more input devices, such as a keyboard, touchscreen, tablet and/or a pointing device, for interacting with a computer user and providing information to the processors 420.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium of storage 440, such as the magnetic hard disk 441 or the removable media drive 442. The magnetic hard disk 441 and/or removable media drive 442 may contain one or more data stores and data files used by embodiments of the present invention, such as the virtual data 141, 143, 145, 147, and 149. The data store 440 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, control data, sensor data, or any other data generated in accordance with the embodiments of the disclosure. Data store contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 400 may further include the computer system 410 operating in a networked environment using logical connections to one or more remote computers, such as remote computing device 480. The network interface 470 may enable communication, for example, with other remote devices 480 or systems and/or the storage devices 441, 442 via the network 471. Remote computing device 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 480). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

It should be appreciated that the program modules, applications, computer-executable instructions, code, or the like depicted in FIG. 4 as being stored in the system memory 430 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 410, the remote device 480, and/or hosted on other computing device(s) accessible via one or more of the network(s) 471, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices. The remote device 480 may store the virtual modules 252 as shown in FIG. 2.

It should further be appreciated that the computer system 410 may include alternate and/or additional hardware, software, or firmware components beyond those described or depicted without departing from the scope of the disclosure. More particularly, it should be appreciated that software, firmware, or hardware components depicted as forming part of the computer system 410 are merely illustrative and that some components may not be present or additional components may be provided in various embodiments. While various illustrative program modules have been depicted and described as software modules stored in system memory 430, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-based method for development of a control application program for a controller used in an automation system, comprising:

developing one or more modules of the control application program to process inputs and outputs of a plurality of control components for performing a particular control task in the automation system;

receiving, by the controller, sensor signals associated with perception of a first real component controlled by the controller in a work environment during an execution of the control application program;

simulating activity of a virtual component including interaction with the real first component, wherein the virtual component is a digital twin of a second real component designed for the work environment and absent in the work environment, and the simulated activity is related to tasks controlled by the control application program;

generating virtual data in response to the simulated activity of the virtual component;

determining parameters for development of the control application program using the sensor signals for the first real component and the virtual data;

rendering an augmented reality (AR) display signal for the work environment based on a digital representation of the virtual data during an execution of the control application program; and displaying the rendered AR display signal on an AR device.

2. The method of claim 1, further comprising:

receiving input from a user interface of the AR device to change parameters of the control application program during repeated simulations of interaction between the first real component and the virtual component.

3. The method of claim 1, further comprising:

interrupting execution of the control application program in response to receiving user input from the augmented reality device; and adjusting control parameters for the control application using knowledge obtained from the augmented reality device.

4. The method of claim 1, further comprising:

testing the control application program using a real-real mode of the AR simulation, wherein executing the control application includes processing sensor signals associated with perception of a second real component present in the work environment and replacing the virtual component in the work environment; and rendering an AR display signal including a virtual object superimposed on the work environment during execution of the control application program.

5. The method of claim 1, further comprising:

testing the control application program using a real-real mode of the AR simulation, wherein executing the control application includes processing sensor signals associated with perception of a second real component present in the work environment and replacing the virtual component in the work environment; and rendering an AR display signal including a virtual path or movement of the second real component as a visual prediction of the execution of the control application program.

6. The method of claim 1, wherein the sensor signals correspond to sensors for one or more of the following work environment elements: a workpiece, a robotic unit, a work surface, or a vision system.

7. The method of claim 1, wherein the sensor signals may include one or more of the following sensed parameters: motion, vibration, temperature, pressure, visual, audio, or speed.

8. The method of claim 1, wherein the virtual data mimics real sensor inputs to the controller.

9. A system comprising:

a controller for an automation system, the controller configured to:

develop one or more modules of the control application program to process inputs and outputs of a plurality of control components for performing a particular control task in the automation system;

receive sensor signals associated with perception of a first real component in a work environment; and a server comprising virtual modules configured to:

simulate activity of a virtual component including interaction with the real first component, wherein the virtual component is a digital twin of a second real component designed for the work environment and absent in the work environment, and the simulated activity is related to tasks controlled by the control application program; and generate virtual data in response to the simulated activity of the virtual component;

wherein the controller is configured to determine parameters for development of the control application program using the sensor signals for the first real component and the virtual data;

wherein the virtual modules are configured to render an augmented reality (AR) display signal for the work environment based on a digital representation of the virtual data the during an execution of the control application program; and an AR device configured to display the rendered AR display signal.

10. The system of claim 9, wherein the controller is configured to:

change parameters of the control application program responsive to receiving input from a user interface of the AR device during repeated simulations of interaction between the first real component and the virtual component.

11. The system of claim 9, wherein the controller is configured to:

interrupt execution of the control application program in response to receiving user input from the augmented reality device; and adjust control parameters for the control application using knowledge obtained from the augmented reality device.

12. The system of claim 9, wherein the controller is configured to:

test the control application program using a real-real mode of the AR simulation, wherein executing the control application includes processing sensor signals associated with perception of a second real component present in the work environment and replacing the virtual component in the work environment; and wherein the virtual modules are configured to render an AR display signal including a virtual object superimposed on the work environment during execution of the control application program.

13. The system of claim 9, wherein the controller is configured to:

test the control application program using a real-real mode of the AR simulation, wherein executing the control application includes processing sensor signals associated with perception of a second real component present in the work environment and replacing the virtual component in the work environment; and wherein the virtual modules are configured to render an AR display signal including a virtual path or movement of the second real component as a visual prediction of the execution of the control application program.

14. The system of claim 9, wherein the sensor signals correspond to sensors for one or more of the following work environment elements: a workpiece, a robotic unit, a work surface, or a vision system.

15. The system of claim 9, wherein the sensor signals may include one or more of the following sensed parameters: motion, vibration, temperature, pressure, visual, audio, or speed.

16. The system of claim 9, wherein the virtual data mimics real sensor inputs to the controller.

* * * * *